United States Patent
Lafuente et al.

(10) Patent No.: US 9,223,697 B2
(45) Date of Patent: Dec. 29, 2015

(54) COMPUTER REPROGRAMMING METHOD, DATA STORAGE MEDIUM AND MOTOR VEHICLE COMPUTER

(75) Inventors: Romain Lafuente, Frouzins (FR); Jean-Christophe Seguy, Grenade (FR); Günther Schirmbeck, Regensburg (DE); André Goebel, Bärenstein (DE); Josef Kulzer, Schmidgaden (DE)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 158 days.

(21) Appl. No.: 13/984,613

(22) PCT Filed: Feb. 3, 2012

(86) PCT No.: PCT/EP2012/000493
§ 371 (c)(1),
(2), (4) Date: Oct. 4, 2013

(87) PCT Pub. No.: WO2012/107189
PCT Pub. Date: Aug. 16, 2012

(65) Prior Publication Data
US 2014/0025870 A1    Jan. 23, 2014

(30) Foreign Application Priority Data
Feb. 9, 2011   (FR) ..................... 11 00395

(51) Int. Cl.
*G06F 3/00* (2006.01)
*G06F 13/00* (2006.01)
(Continued)

(52) U.S. Cl.
CPC .............. *G06F 12/0246* (2013.01); *G06F 8/67* (2013.01); *G06F 9/44573* (2013.01); *G06F 9/44505* (2013.01)

(58) Field of Classification Search
None
See application file for complete search history.

(56) References Cited

U.S. PATENT DOCUMENTS

| 5,881,327 | A  | * | 3/1999 | Yoshida ..................... 396/207 |
| 7,337,317 | B2 | * | 2/2008 | Meggitt ................. G06F 8/63 713/164 |

(Continued)

FOREIGN PATENT DOCUMENTS

WO    2009/074499    6/2009

OTHER PUBLICATIONS

International Search Report dated Sep. 5, 2012, corresponding to PCT/EP2012/000493.

(Continued)

*Primary Examiner* — Michael Sun
(74) *Attorney, Agent, or Firm* — Young & Thompson

(57) ABSTRACT

A method (50) for reprogramming a computer (10) by modification of the content of a non-volatile rewritable memory (104) of the computer via reprogramming software stored in the non-volatile rewritable memory (104). The reprogramming software includes a task sequencer and a plurality of software components, divided in advance into at least two sets, namely: a first set including each software component to be executed simultaneously with an operation of modifying the content of the non-volatile rewritable memory (104), and a second set including some or all of the other software components of the reprogramming software. During the reprogramming of the computer, the software components of the second set are executed from the non-volatile rewritable memory (104), and the task sequencer and the software components of the first set to be executed are copied in advance into a volatile memory (106) of the computer, and are executed from the volatile memory.

15 Claims, 2 Drawing Sheets

(51) Int. Cl.
*G06F 12/02* (2006.01)
*G06F 9/445* (2006.01)

(56) References Cited

U.S. PATENT DOCUMENTS

| | | | |
|---|---|---|---|
| 2004/0187035 A1* | 9/2004 | Schwan et al. | 713/202 |
| 2004/0192373 A1* | 9/2004 | Galetti | 455/550.1 |
| 2006/0084446 A1* | 4/2006 | Henriksson | 455/456.1 |
| 2007/0036021 A1* | 2/2007 | Nakagaki | G11C 16/10 365/230.03 |
| 2009/0125203 A1* | 5/2009 | Lindqvist | B60W 10/06 701/96 |
| 2012/0019674 A1* | 1/2012 | Ohnishi | G08C 17/00 348/207.1 |

OTHER PUBLICATIONS

Andreas Patzer, et al.; "Flexible Flash Solution for Every Job—Open Standards Enable Use of Generic Tool Chains"; Mar. 3, 2008; pp. 1-8; XP055005338.

Mentor Graphics: "Volcano Bootloader", Mentor Graphics—Automotive Datasheet; Jan. 1, 2007; pp. 1-2; XP055005532.

Peter Liebscher; "Loading Automotive Software Made Easy by a CAN/LIN flash bootloader"; May 1, 2004; pp. 24-25; XP055004102.

Andreas Patzer; "XCP at the Focal Point of Measurement and Calibration Applications"; May 22, 2007, pp. 1-5; XP055005201.

Hung-Manh Pham, et al.; "Reconfigurable ECU Communications in Autosar Environment"; Intelligent Transport Systems Telecommunications; Oct. 20, 2009; pp. 581-585; XP031619123.

* cited by examiner

COMPUTER REPROGRAMMING METHOD, DATA STORAGE MEDIUM AND MOTOR VEHICLE COMPUTER

BACKGROUND OF THE INVENTION

1. Field of the Invention

The present invention relates to the field of motor vehicle computers; more particularly, it concerns a method of reprogramming a motor vehicle computer, a data storage medium in which reprogramming software is stored, and a motor vehicle computer including a data storage medium of this type.

2. Description of the Related Art

In a known way, a motor vehicle computer takes the form of a microcontroller including, in addition to one or more microprocessors, electronic memories (flash, EEPROM, RAM, etc.), interface peripherals, etc.

Computer program products, or "software", composed of a set of instructions in program code to be executed by a microprocessor in order to carry out the various tasks of said computer, are stored in non-volatile memories of the computer. As a general rule, three main types of software are stored in non-volatile memories of the computer, as follows:

- software known in the English-language literature as "boot software", to be executed, notably, on the start-up of the computer for the initialization of the latter,
- software known in the literature as "application software", to be executed in order to carry out the specific tasks of the computer,
- reprogramming software, also known in the English-language literature as "loader software", for loading new software intended to replace some or all of the software stored in rewritable non-volatile memories of the computer.

The boot software and reprogramming software may also be combined in the same piece of software, known in this case as a "boot loader".

At the present time, boot software, reprogramming software and application software are generally stored in the same rewritable non-volatile electronic memory, for example a flash memory.

Clearly, if the reprogramming software is executed by a microprocessor directly from said flash memory in order to modify the application software and/or the boot software, this will impose constraints for the flash memory, in that said processor will require simultaneous read and write access to the content of said flash memory.

However, current flash memories have limited capacity for simultaneous read and write access. There are known flash memories organized in a limited number of different segments, in which it is possible to have read access to one segment while having write access to another segment. However, it is not uncommon for simultaneous access to be required to the same segment of a flash memory for both writing and reading.

In order to overcome the limited simultaneous read and write access capacity of current flash memories, there is a known way of copying the reprogramming software, before its execution, from the flash memory to a volatile electronic memory such as a RAM memory.

The reprogramming software is then executed from the RAM memory, in such a way that the microprocessor has read access to the content of the RAM memory and write access to the content of the flash memory. This makes it unnecessary to have simultaneous write and read access to the content of the flash memory.

However, it is difficult to implement this approach in motor vehicle computers, since only a limited amount of RAM memory is generally provided, in order to keep the cost of the computer as low as possible.

BRIEF SUMMARY OF THE INVENTION

The object of the present invention is, notably, to provide a solution which enables the RAM memory requirement to be reduced.

In a first aspect, the present invention relates to a method of reprogramming a motor vehicle computer by modifying the content of a non-volatile rewritable memory of said computer, said reprogramming being carried out by means of reprogramming software stored in the non-volatile rewritable memory, the reprogramming software being organized in a plurality of software components assigned to tasks to be performed for reprogramming the computer, the execution of these tasks being initiated by a task sequencer. According to the invention, the software components of the reprogramming software are divided in advance into at least two sets, namely:

- a first set including each software component to be executed simultaneously with an operation of modifying the content of the non-volatile rewritable memory,
- a second set including some or all of the other software components of the reprogramming software.

Additionally, during the reprogramming of the computer:

- the software components of the second set are executed by a microprocessor of the computer from the non-volatile rewritable memory,
- the task sequencer and the software components of the first set to be executed are beforehand copied into a volatile memory of the computer, and are executed by the microprocessor from said volatile memory.

Preferably, the task sequencer is executed in two different operating modes, namely a first operating mode called the "standard mode", in which software components of the first and second set are executed, and a second operating mode, called the "reprogramming mode", used in the operations of modifying the content of the non-volatile rewritable memory, in which only the software components of the first set are executed.

Preferably, the method includes:

- a step of copying the task sequencer and the software components of the first set to be executed into the volatile memory of the computer,
- a step of executing the task sequencer in the standard mode from the volatile memory,
- a step of determining whether a request for modification of the content of the non-volatile rewritable memory has been received,
- if a request for modification of the content of the non-volatile rewritable memory has been received, a step of executing the task sequencer in the reprogramming mode, during which the modification operations identified in the request are executed,
- a step of determining whether there are any outstanding operations for modification of the content of the non-volatile rewritable memory,
- if there are no more operations for modification of the content of the non-volatile rewritable memory to be performed, the method returns to the step of executing the task sequencer in the standard mode.

Preferably, if a request for modification of the content of the non-volatile rewritable memory has been received:

the task sequencer, running in standard mode, executes a software component for virtual modification which copies the request into a volatile buffer memory and switches the task sequencer to the reprogramming mode, the task sequencer, running in reprogramming mode, executes a software component for real modification which reads the request from the volatile buffer memory and performs the modification operations identified in the request.

Preferably, the software components of the first set are organized in a number of groups, each associated with a different reprogramming context, said method including a step of detecting the context of the reprogramming to be performed, only the software components of the first set of the group associated with the detected context being copied into the volatile memory.

Preferably, specific data for the configuration of the task sequencer are associated with each reprogramming context, said configuration data associated with the detected context being copied into the volatile memory, said method including a step of configuration of the standard and reprogramming modes of the task sequencer as a function of said configuration data.

Preferably, the reprogramming contexts correspond to different communication protocols to be used, during reprogramming, between the computer and an external reprogramming device.

In a second aspect, the present invention relates to a data storage medium of the non-volatile rewritable electronic memory type, including reprogramming software instructions which, when executed by a microprocessor of a motor vehicle computer, perform the reprogramming of said computer by following a method according to the invention.

In a third aspect, the present invention relates to a motor vehicle computer including a data storage medium according to the invention.

BRIEF DESCRIPTION OF THE DRAWINGS

The invention will be more clearly understood from the following description, provided solely by way of non-limiting example, which refers to the drawings, of which.

DETAILED DESCRIPTION OF THE PREFERRED EMBODIMENTS

Figure 1:
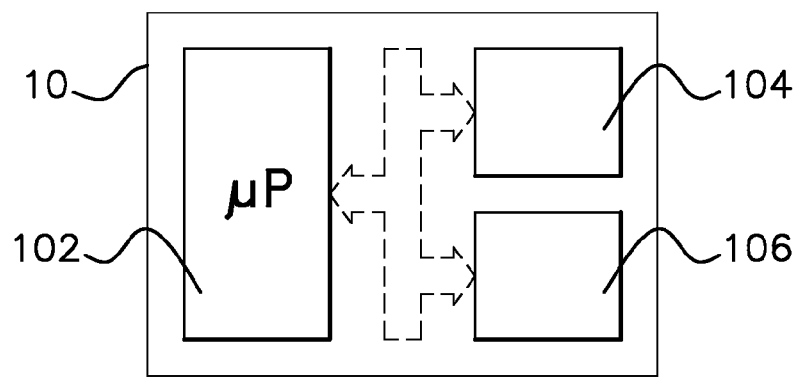
FIG. 1 shows a schematic representation of a motor vehicle computer 10.

FIG. 1 shows, in a highly schematic way, a motor vehicle computer 10.

In a known way, the motor vehicle computer 10 includes a microprocessor 102 connected to electronic memories 104, 106 by a data bus 108. The computer 10 includes at least one non-volatile rewritable memory 104, in which are stored program code instructions, or software, to be executed for the purpose of performing the various tasks assigned to said computer. The computer 10 also includes at least one volatile memory 106, called "RAM memory", into which data are temporarily copied during the operation of the computer 10. It should be noted that the microprocessor 102 and the flash memory 104 and RAM memory 106 are, in certain embodiments, integrated into a single integrated circuit, known as a microcontroller.

In the context of the invention, the computer 10 is reprogrammed by modification of the content of the non-volatile rewritable memory 104 by means of reprogramming software stored in said non-volatile rewritable memory. The term "modification of the content of the non-volatile rewritable memory" denotes the writing of new software to be executed into said non-volatile rewritable memory and/or the erasure of part of said non-volatile rewritable memory.

A particularly advantageous, but non-limiting, application of the present invention can be seen in the case of a non-volatile rewritable memory 104 with a limited capacity for simultaneous access for reading and writing (or erasure), such as a flash memory. In the remainder of the description it will be assumed that the non-volatile rewritable memory 104 in question is a flash memory, although this assumption is non-limiting.

The reprogramming software includes, notably, a task sequencer and software components whose execution is initiated by said task sequencer.

A task sequencer resembles an operating system. In practice, however, a task sequencer of the reprogramming software of a motor vehicle computer 10 may be a simple program, which merely executes in sequential and recursive manner a certain number of software components assigned to tasks to be performed to reprogram the computer 10.

In principle, a reprogramming method 50 according to the invention is based on a preliminary division of the software components into at least two subsets:

a first set including each software component to be executed simultaneously with an operation of modifying the content of the flash memory 104, and a second set including some or all of the other software components of the reprogramming software.

During the reprogramming of the computer 10, the reprogramming software is executed by the microprocessor 102 of the computer 10.

The software components of the second set are executed from the flash memory 104. The task sequencer and the software components of the first set to be executed are beforehand into the RAM memory 106 of the computer 10, and are executed from said RAM memory.

It should be noted that the software components of the first set are not necessarily software components executed solely during the operations of modifying the content of the flash memory 104. Each software component to be executed simultaneously with an operation of modifying the content of the flash memory 104 must be placed in the first set, and must be executed from the RAM memory 106.

This division of the software components into two sets, of which only the first set is executed from the RAM memory 106, makes it possible to reduce the amount of data to be copied into the RAM memory 106 in order to perform the reprogramming of the computer 10. This is because only some of the software components, instead of all the software components of the reprogramming software, are copied into the RAM memory 106.

It should be noted that, in certain embodiments of the reprogramming method 50, it is perfectly feasible for certain software components which are never executed simultaneously with an operation of modifying the content of the flash memory 104 to be assigned to a third set of software components to be executed from the RAM memory 106. In other words, it is possible to execute certain software components from the RAM memory 106, even if they are never executed simultaneously with an operation of modifying the content of the flash memory 104.

Preferably, all the software components belong to both the first and the second set. In other words, the second set includes all the software components not identified as requiring to be executed simultaneously with an operation of modifying the content of the flash memory 104. Clearly, therefore, the amount of data to be copied temporarily into the RAM memory 106 is minimized and reduced to the software components of the first set only.

In the remainder of the description it will be assumed that all the software components belong to both the first and the second set, although this assumption is non-limiting.

Preferably, the task sequencer includes two different operating modes, as follows:
  a first operating mode called the "standard mode", in which software components of the first and second set are executed, and
  a second operating mode, called the "reprogramming mode", used in the operations of modifying the content of the flash memory 104, in which only the software components of the first set are executed.

Because of these two different operating modes, and because the task sequencer is itself executed from the RAM memory 106, it is ensured that no simultaneous access for reading and writing (or erasure) to the flash memory 104 will be necessary. This is because, clearly, if the task sequencer is executed in reprogramming mode while an operation of modifying the content of the flash memory 104 is in progress, no read access to the flash memory 104 will be required, since only the software components of the first set will be executed from the RAM memory 106.

Figure 2:
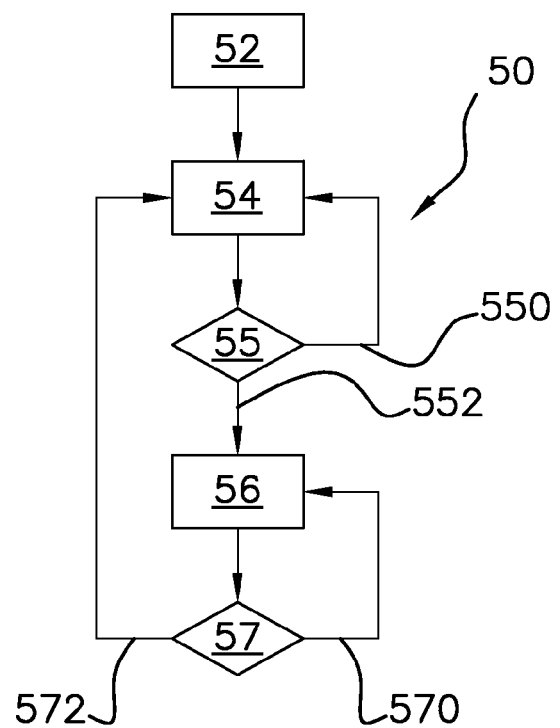
FIG. 2 shows a diagram schematically representing the main steps of a preferred embodiment of a reprogramming method according to the invention.

FIG. 2 shows the main steps of a preferred embodiment of the reprogramming method 50, using the standard and reprogramming modes of the task sequencer.

As shown in FIG. 2, the method 50 includes a preliminary step 52 of copying the task sequencer and the software components of the first set to be executed into the RAM memory 106 of the computer 10.

Subsequently, the method 50 includes:
  a step 54 of executing the task sequencer in the standard mode from the RAM memory 106,
  a step 55 of determining whether a request for modification of the content of the flash memory 104 has been received; if no modification request has been detected (reference 550), the method 50 continues step 54 of executing the task sequencer in the standard mode,
  if a request for modification of the content of the flash memory 104 has been detected (reference 552), a step 56 of executing the task sequencer in the reprogramming mode is performed, during which the modification operations identified in the request are executed,
  a step 57 of determining whether all the operations of modifying the content of the flash memory 104 have been executed; if there are outstanding operations (reference 570), the method 50 continues step 56 of executing the task sequencer in the reprogramming mode,
  if there are no outstanding operations for modifying the content of the flash memory 104 (reference 572), the method 50 returns to the step 54 of executing the task sequencer in the standard mode.

Preferably, the reprogramming software includes a virtual modification software component in the flash memory 104, which is incorporated into the second set of software components.

The virtual modification software component is executed by the task sequencer in standard mode, when a request for modification of the content of the flash memory 104 is detected. The virtual modification software component does not modify the content of the flash memory 104 in accordance with what is specified in the request (the task sequencer is in standard mode and said virtual modification software component belongs to the second set of software components). Instead, the virtual modification software component copies the request to a volatile buffer memory, for example the RAM memory 106.

If the request has been copied into the volatile buffer memory, the virtual modification software component switches the task sequencer to the reprogramming mode.

In the reprogramming mode, the task sequencer executes, notably, a real modification software component which will modify the content of the flash memory 104 in accordance with what is specified in the request stored in the volatile buffer memory (to which said request has been copied by the virtual modification software component). If all the modification operations specified in the request have been performed, the real modification software component switches the task sequencer to the standard mode.

A solution of this type, based on the use of two software components for modifying the content of the flash memory 104, one real and the other virtual, has the advantage of being particularly robust in terms of preventing simultaneous access for reading and writing (or erasure) to the flash memory 104.

In a variant of the method 50, compatible with any of the embodiments described above, the software components of the first set are organized in advance into a number of groups, each associated with a different reprogramming context.

Figure 3:
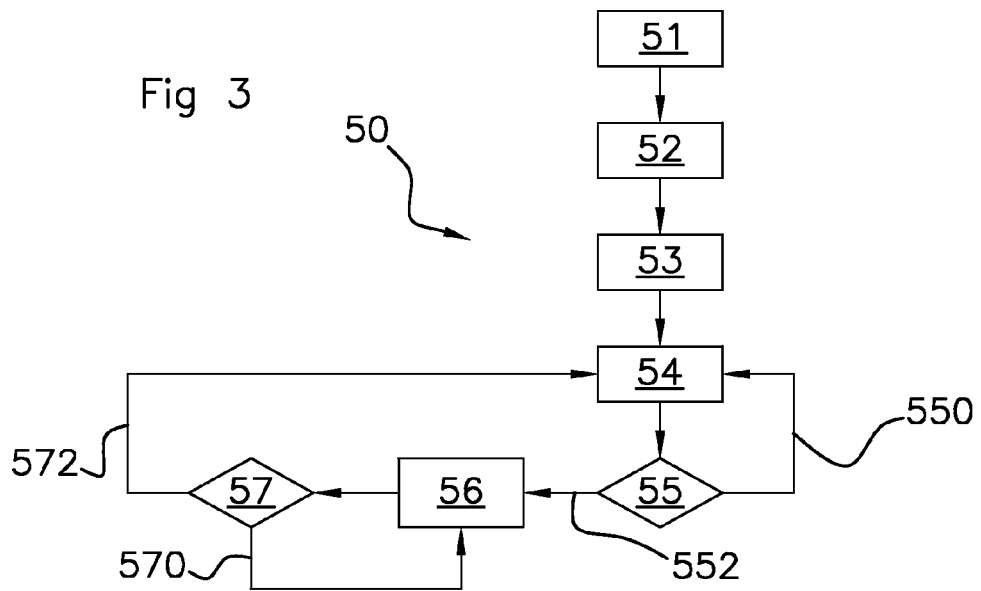
FIG. 3 shows a diagram schematically representing a variant embodiment of the reprogramming method shown in FIG. 2, and FIGS. 4a and 4b show schematic representations of the organization, in relation to the reprogramming of a computer according to the invention, of the content of a flash memory and of a RAM memory of said computer.

FIG. 3 shows an example of the use of this variant, in which the method 50 includes the same steps as the embodiment described with reference to FIG. 2, and also includes a preliminary step 51 of detection of the context of the reprogramming to be performed.

During the step 52 of copying software components to be executed, only the software components of the group associated with the detected context are copied to the RAM memory 106.

For example, the reprogramming contexts correspond to different communication protocols to be used, during reprogramming, between the computer 10 and an external device (not shown in the drawings). This is because the reprogramming of a computer 10 is generally performed by connecting an external device to said computer. In order to exchange data, for example in order to transfer new software to be written to the flash memory 104, the external device and the computer 10 must support the same communication protocol. In practice, a motor vehicle computer 10 is generally required to support a plurality of different communication protocols (CAN, FlexRay, Ethernet, etc.), and it is therefore advantageous to organize the software components in groups associated with these different communication protocols. By preventing the computer 10 from simultaneously communicating with two external devices using two different communication protocols, it is possible to ensure that only the group of software components associated with the communication protocol to be used will be copied to the RAM memory 106. Therefore, the amount of data to be stored temporarily in the RAM memory 106 is reduced, and the requisite size of the RAM memory 106 is also reduced.

In practice, it may prove necessary to configure the task sequencer in accordance with the reprogramming context, since the tasks to be executed may vary from one reprogramming context to another.

In a variant of the method 50, compatible with any of the embodiments described above, specific configuration data for the task sequencer are associated with each reprogramming context. The configuration data associated with a reprogramming context can be used to configure the task sequencer so that it executes the tasks specified for this context.

Said configuration data associated with the detected context are also copied from the flash memory 104 to the RAM memory 106. In this case, the reprogramming method 50 includes a step 53 of configuration of the standard and reprogramming modes of the task sequencer as a function of said configuration data stored in the RAM memory 106.

Since only the configuration data of the detected reprogramming context are copied to the RAM memory 106, these data may still be copied to the same address of the RAM memory 106, relating to the task sequencer. Thus said task sequencer can be preconfigured to read the control data from a predefined address. On the other hand, it is to be understood that, if the task sequencer were to read the control data from the flash memory 104, the address of the control data in the flash memory 104 would depend on the reprogramming context and could not be predefined.

Figure 4A:
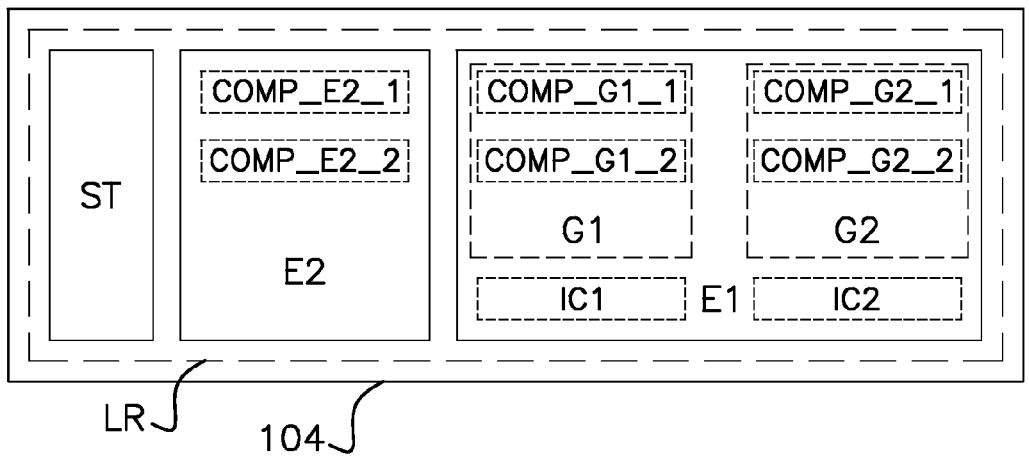

FIG. 4a shows in a highly schematic manner the organization of the content of the flash memory 104. In this figure, only one reprogramming software LR is shown.

As mentioned above, the reprogramming software LR is organized into a task sequencer ST and a first set E1 and a second set E2 of software components.

As described above, the first set E1 includes the software components executed simultaneously with an operation of modifying the content of the flash memory 104.

The second set E2 comprises software components COMP_E2_1 and COMP_E2_2.

The first set E1 is also organized into groups of software components associated with different reprogramming contexts. In the non-limiting example of FIG. 4a, two reprogramming contexts are considered, and are associated with two groups of software components, indicated respectively by G1 and G2.

The group G1 comprises software components COMP_G1_1 and COMP_G1_2. The group G2 comprises software components COMP_G2_1 and COMP_G2_2.

Other data of the reprogramming software LR are also stored in the flash memory 104, particularly the configuration data associated with the two reprogramming contexts, indicated by IC1 and IC2 respectively.

Figure 4B:
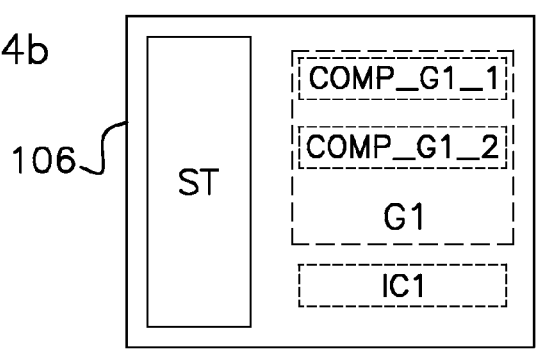

FIG. 4b shows schematically the organization of the content of the RAM memory 106, after the reprogramming context has been detected (in the example illustrated by FIG. 4b, this is the reprogramming context associated with the group G1 and with the configuration data IC1), and after the task sequencer ST, the group G1 of software components and the configuration data IC1 have been copied to the RAM memory 106.

The next step is then step 53 for the configuration of the task sequencer ST with the configuration data IC1 stored in the RAM memory 106.

The present invention also relates to the flash memory 104 in which are stored reprogramming software instructions which, when executed by a microprocessor 102 of a motor vehicle computer 10, perform the reprogramming of said computer by following the reprogramming method 50 according to any of the embodiments of the invention. The present invention also relates to a motor vehicle computer 10 including a flash memory 104 of this type.

The above description clearly shows that the present invention achieves its declared aims as a result of its different characteristics and their advantages.

In particular, it is to be understood that, because only some of the software components (those of the first set, identified as those to be executed simultaneously with an operation of modifying the content of the flash memory 104) are copied temporarily to the RAM memory 106, the requisite size of the RAM memory 106 is much smaller than that of the prior art solutions. Furthermore, by using a task sequencer having two operating modes, of which one, used in operations of modifying the content of the flash memory 104, uses only the software components of the first set stored in the RAM memory 106, it is possible to ensure that no read access to the flash memory 104 will take place simultaneously with a write (or erasure) access to the flash memory 104.

The invention claimed is:

1. A method of reprogramming a motor vehicle computer, the method comprising:
reprogramming the motor vehicle computer by modifying content of a non-volatile rewritable memory of said computer, said reprogramming being carried out by reprogramming software stored in the non-volatile rewritable memory, the reprogramming software being organized into a plurality of software components assigned to tasks to be performed for reprogramming the computer, the execution of the tasks being initiated by a task sequencer, the software components of the reprogramming software being divided in advance into at least two sets, a first set including each software component to be executed simultaneously with an operation of modifying the content of the non-volatile rewritable memory, a second set including some or all of the other software components of the reprogramming software,
wherein, during the reprogramming, the software components of the second set are executed by a microprocessor of the computer from the non-volatile rewritable memory, and the task sequencer and the software components of the first set to be executed are copied into a volatile memory of the computer before the reprogramming, and are executed by the microprocessor from said volatile memory during the reprogramming.

2. The method of reprogramming as claimed in claim 1, wherein the task sequencer is executed in two different operating modes, a first operating mode being a standard mode in which software components of the first set and the second set are executed, a second operating mode being a reprogramming mode used in the modifying the content of the non-volatile rewritable memory, in which only the software components of the first set are executed.

3. The method of reprogramming as claimed in claim 2, further comprising:
a step of copying the task sequencer and the software components of the first set to be executed into the volatile memory of the computer;
a step of executing the task sequencer in the standard mode from the volatile memory;
a step of determining whether a request for modification of the content of the non-volatile rewritable memory is received;
when a request for modification of the content of the non-volatile rewritable memory is received, a step of executing the task sequencer in the reprogramming mode, during which the modification operations specified in the request are executed;

a step of determining whether there are any outstanding operations for modification of the content of the non-volatile rewritable memory; and when there are no outstanding operations for modification of the content of the non-volatile rewritable memory, the method returns to the step of executing the task sequencer in the standard mode.

4. The method as claimed in claim 3, wherein when the request for modification of the content of the non-volatile rewritable memory is received:

the task sequencer, running in the standard mode, executes a software component for virtual modification which copies the request into a volatile buffer memory and switches the task sequencer to the reprogramming mode, and the task sequencer, running in the reprogramming mode, executes a software component for real modification which reads the request from the volatile buffer memory and performs the modification operations identified in the request.

5. The method as claimed in claim 1, wherein the software components of the first set are organized in a number of groups, each group being associated with a different reprogramming context, said method further including a step of detecting the context of the reprogramming to be performed, only the software components of the first set of the group associated with the detected context being copied to the volatile memory.

6. The method as claimed in claim 5, wherein specific data for the configuration of the task sequencer are associated with each reprogramming context, said configuration data associated with the detected context being copied to the volatile memory, said method further including a step of configuring the standard and reprogramming modes of the task sequencer as a function of said configuration data.

7. The method as claimed in claim 5, wherein the reprogramming contexts correspond to different communication protocols to be used, during reprogramming, between the computer and an external reprogramming device.

8. A non-transitory data storage medium of the non-volatile rewritable electronic memory, comprising:

reprogramming software instructions which, when executed by the microprocessor of the motor vehicle computer, perform the reprogramming of said computer by following the method as claimed in claim 1.

9. A motor vehicle computer, comprising:

the non-transitory data storage medium as claimed in claim 8.

10. The method as claimed in claim 2, wherein the software components of the first set are organized in a number of groups, each group being associated with a different reprogramming context, said method further including a step of detecting the context of the reprogramming to be performed, only the software components of the first set of the group associated with the detected context being copied to the volatile memory.

11. The method as claimed in claim 3, wherein the software components of the first set are organized in a number of groups, each group being associated with a different reprogramming context, said method further including a step of detecting the context of the reprogramming to be performed, only the software components of the first set of the group associated with the detected context being copied to the volatile memory.

12. The method as claimed in claim 4, wherein the software components of the first set are organized in a number of groups, each group being associated with a different reprogramming context, said method further including a step of detecting the context of the reprogramming to be performed, only the software components of the first set of the group associated with the detected context being copied to the volatile memory.

13. The method as claimed in claim 12, wherein specific data for the configuration of the task sequencer are associated with each reprogramming context, said configuration data associated with the detected context being copied to the volatile memory, said method further including a step of configuring the standard and reprogramming modes of the task sequencer as a function of said configuration data.

14. The method as claimed in claim 10, wherein specific data for the configuration of the task sequencer are associated with each reprogramming context, said configuration data associated with the detected context being copied to the volatile memory, said method further including a step of configuring the standard and reprogramming modes of the task sequencer as a function of said configuration data.

15. The method as claimed in claim 6, wherein the reprogramming contexts correspond to different communication protocols to be used, during reprogramming, between the computer and an external reprogramming device.

* * * * *